July 17, 1934.  N. ROACH  1,966,562

VALVE

Filed Nov. 3, 1933

INVENTOR
NATHAN ROACH
BY
ATTORNEYS

Patented July 17, 1934

1,966,562

UNITED STATES PATENT OFFICE 1,966,562

VALVE

Nathan Roach, Cleveland, Ohio, assignor to The Cleveland Brass Manufacturing Company, Cleveland, Ohio, a corporation of Ohio Application November 3, 1933, Serial No. 696,576

2 Claims. (Cl. 251—134)

This invention relates to a valve of the self-closing type.

One object of the invention is to provide a valve which is simple and efficient in its operation but which comprises a relatively small number of parts so that it is cheaply constructed and easily assembled.

Another object of the invention is to provide a valve of the globe type arranged in a novel manner so that a large portion of the liquid flowing therethrough is provided with a substantially unobstructed path through the valve opening.

Another object of the invention is to provide an improved valve which may be locked in its open or closed position and which is so arranged that it is not easily tampered with in its closed position.

Another object of the invention is to provide a one-piece valve body providing novel means for lateral access to the valve parts.

Figure 1:
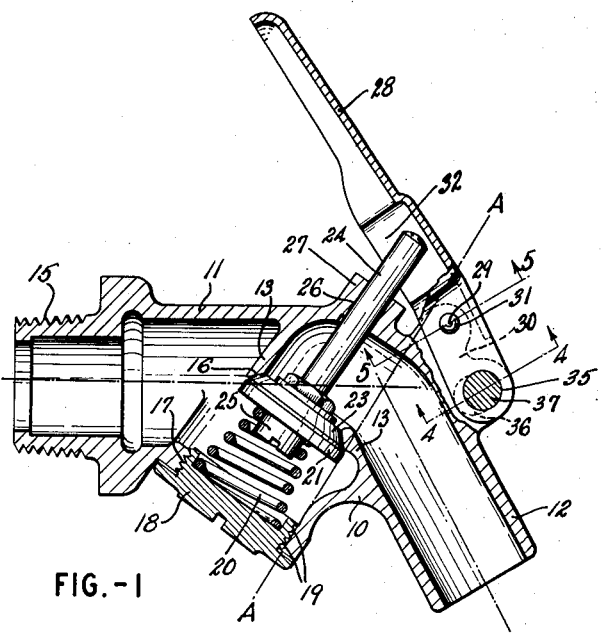
Figure 4:
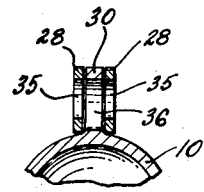
Figure 3:
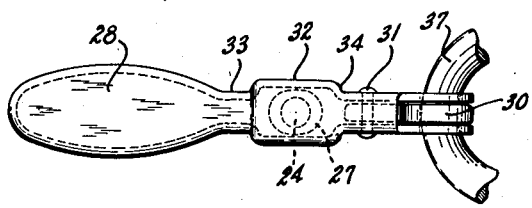
Figure 2:
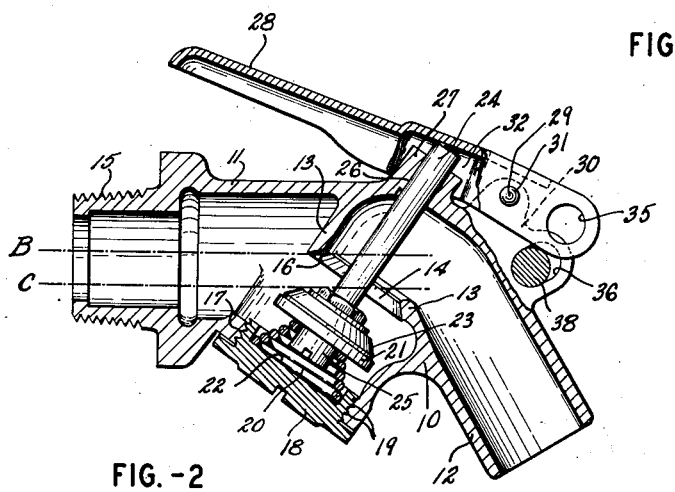
Figure 5:
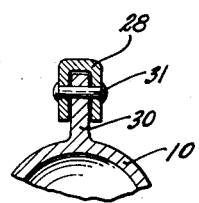

Other objects and advantages of my invention will be apparent from the accompanying description together with the drawing in which Fig. 1 is a sectional view showing the parts of the valve in closed position; Fig. 2 is a sectional view showing the valve open; Fig. 3 is a plan view of the operating lever; while Figs. 4 and 5 are sectional views along similarly numbered lines of Fig. 1.

My invention comprises in general a valve body having inlet and outlet conduits disposed at an angle to each other, a partition extending transversely of the inlet conduit adjacent the angle, there being an opening in the partition surrounded by a valve seat and inclined in the general direction of the outlet conduit. A valve disk is provided which is adapted to coact with the seat and is normally biased theretoward. The valve stem extends through the valve body on the outside of the angle and a lever is provided for depressing the valve stem to open the valve. The valve stem lies in the angle between the two conduits, substantially parallel to a line bisecting the angle. This gives a position of the valve opening which provides the maximum clear opening in the line of liquid flow for a given displacement of the valve disk from its seat.

While my valve is adapted for use in many ways I have chosen to illustrate herein a type of valve quite commonly used in the control of the flow of gasolines, oils, and similar liquids, out of stationary containers. The valve illustrated comprises a body 10 having an inlet conduit 11 and an outlet conduit 12 positioned at an angle to each other and between which a partition 13 is provided in which the valve opening 14 is located. The inlet conduit may be provided with a thread 15 or other suitable means for attachment to a liquid container, while the outlet conduit 12 would normally be arranged in suitable nozzle form. The valve opening 14 is preferably circular in shape and the general plane of the valve seat 16, formed about the edges of the opening, is inclined in the same general direction as the inclination of the outlet conduit 12, or in other words, it is inclined downwardly in the direction of liquid flow through the valve.

While the valve body might be formed in various ways, I prefer to make the main portions of the body, including the inlet and outlet conduits and the partition which contains the valve opening, of one integral casting as illustrated.

To provide for the proper machining of the valve seat 16 and also access to the valve parts for repairs, I provide an opening 17 through the wall of the valve body on the inside of the angle, this opening being opposite the valve seat and preferably at least coextensive therewith, so that a tool may be inserted easily through the opening for the proper machining of the seat. A closure member 18 is provided for the opening 17 and preferably this is removably positioned by means of screw threads 19. The closure cap 18 or the walls about the opening 17 are preferably arranged in a manner to support a helical spring 20 in position against a valve disk 21 adapted to close the valve opening. In the embodiment shown the cap 18 has a hollowed-out central portion 22 which holds the spring in place.

The valve disk 21 is provided with a suitable washer or gasket member 23 of suitable material so as to provide a tight joint against the valve seat. A valve stem 24 extends normal to the valve disk and is secured thereto by suitable members, one of which, 25, may be so arranged as to act as a centering member for the helical spring 20. Where the valve stem passes through the valve body it is supported in a bearing 26 of an elongated boss 27 which serves to maintain the valve stem in proper alignment.

For depressing the valve stem to open the valve, a lever 28, which is a lever of the second order, is fulcrumed at 29 to a bracket 30 on the outer wall of the outlet conduit. It will be noted in Fig. 1 that line A—A bisects the angle between the inlet and outlet conduits. It will also be noted that valve stem 24 is substantially parallel to this bisecting line, lying on the inlet conduit side of said line, and the operating lever fulcrum 29 is on the outlet conduit or nozzle side of the said bisecting line. This positioning of the parts has several advantages. It will be noted in Fig. 2 that, with the valve in its full open position, the liquid flowing therethrough has a substantially clear passage between the lines B and C, which represent the lower limit of the upper edge of the valve seat and the upper edge of the valve disk respectively. With other angular positions of the valve parts this clear opening is less in the general direction of liquid flow for equal amounts of valve opening.

Furthermore, the arrangement of the operating lever is such that the fulcrum may be located fairly close to the wall of the outlet conduit and yet give satisfactory operating positions of the valve. This gives a more compact arrangement than is usually found in such valves. In the valve-closed position, the lever 28 is substantially in alignment with the outer wall of the outlet conduit, while in the valve-open position the lever more nearly approaches the general axis of the inlet conduit.

Certain details of construction of the operating lever possess novel features which will now be described. The lever is preferably made of sheet metal bent generally U-shape in section, and pivoted to the valve body by a pin 31 extending through the sides or flanges of the U and through the bracket 30 of the valve body as is clearly shown in Fig. 5. Where the lever contacts the valve stem, it is provided with longitudinally extending flanges 32 projecting downwardly on opposite sides of the valve stem, and these flanges are pressed toward each other at 33 on the side of the valve stem opposite the fulcrum. This renders it difficult to enter a pry between the valve stem and the lever 28, when the valve is locked closed, as the valve stem is substantially enclosed by the flanges 32 and 33 on three sides. These flanges may also be pressed toward each other at 34 on the side of the valve stem toward the fulcrum, although this is not particularly necessary as the proximity of the fulcrum prevents the entering of a pry upon that side of the valve stem. It will be noted also in Fig. 3 that the flanges 32, 33, 34, substantially conform to and surround the boss 27 when the lever is in its valve-open position.

Means is provided for holding or locking the valve control lever in both open and closed positions. In the embodiment shown, this comprises coacting means on the wall of the outlet conduit and on the lever on that side of the fulcrum opposite the valve stem. In the end of the lever 28, an opening 35 is provided which in the closed position of the valve, see Fig. 1, registers with an opening 36 in a projection on the conduit wall. A lock 37 or other holding member may be passed through the registering openings in this position to maintain the valve closed. Fig. 2 illustrates a manner of holding the valve in a full open or partly open position by means of a member 38 passing through the opening 36 and resting beneath the end of lever 28. It will be apparent that by varying the size of member 38 the valve may be held in various partially open positions.

I have hereinabove disclosed a self-closing valve comprising very few parts, if the assembled valve disk and stem be regarded as one part. Such a valve is easily made and assembled. The valve body 10 having been cast integrally as shown, and the seat 16 having been machined by a tool passing through the opening 17, the parts may then be assembled by passing the valve disk and stem through the opening 17 with the stem extending through the boss 27, and the spring 20 is then placed beneath the valve disk and the cap 18 screwed in place. The lever 28 is then pinned to the valve body at 29 and the valve is completely assembled.

Other embodiments of the novel features of my invention will occur to those skilled in the art, but I do not desire to be limited to the form of my invention herein illustrated, except as defined in the appended claims.

What I claim is:

1. In a valve for attachment to a stationary container, the combination of a valve body having inlet and outlet conduits disposed at an angle to each other, a partition extending transversely of said inlet conduit adjacent the angle, said partition having an opening surrounded by a valve seat inclined in the general direction of said outlet conduit, a valve disk adapted to coact with said seat, means normally biasing said disk toward the seat, a valve stem extending normal to said disk through the wall of the valve body outside the angle and adjacent the apex thereof, a lever of the second order fulcrumed on the outer wall of one of said conduits for forcing said disk from said seat, said lever having an extension beyond the fulcrum, there being an opening through the extension, a lug on the outer wall of one of said conduits, and there being an opening through said lug adapted to register with the first named opening when the valve is closed, whereby a locking member passing through both openings will hold the valve closed and a locking member through the lug opening and beneath the extension will hold the valve open.

2. In a valve for attachment to a stationary container, the combination of a valve body having inlet and outlet conduits disposed at an angle to each other, a partition extending transversely of said inlet conduit adjacent the angle, said partition having an opening surrounded by a valve seat inclined in the general direction of said outlet conduit, a valve disk adapted to coact with said seat, means normally biasing said disk toward the seat, a valve stem extending normal to said disk through the wall of the valve body outside the angle and adjacent the apex thereof, a lever of the second order fulcrumed on the outer wall of one of said conduits for forcing said disk from said seat when the lever is moved from one position to another, a lug on the outer wall of said valve body adjacent the fulcrum, there being an opening through said lug adapted to receive a locking member, the lever in one position being disposed above the locking member and in its other position having a portion of the lever disposed below the locking member.

NATHAN ROACH.